Nov. 26, 1935.  K. MOHR  2,022,006

SAFETY DEVICE FOR REVERSIBLE INTERNAL COMBUSTION AND OTHER ENGINES

Filed Oct. 2, 1930

Inventor
Karl Mohr
By Knight Bros
Attorneys

Patented Nov. 26, 1935

2,022,006

UNITED STATES PATENT OFFICE 2,022,006

SAFETY DEVICE FOR REVERSIBLE INTERNAL COMBUSTION AND OTHER ENGINES

Karl Mohr, Kiel, Germany, assignor to Fried. Krupp Germaniawerft Aktiengesellschaft, Kiel-Gaarden, Germany Application October 2, 1930, Serial No. 485,996
In Germany October 29, 1929

3 Claims. (Cl. 123—41)

In reversible internal combustion engines and particularly engines for propelling ships, the fact must be taken into consideration that an engine running at full speed does not stop immediately after the reversal of the control mechanism which determines the direction of rotation of the engine, but continues for some time to run in the original direction of rotation. If, therefore, in consequence of inexpert handling, the fuel feed to the working cylinders is effected too soon, that is to say, after the reversal of the control mechanism but before the engine has decelerated to a stop, there is a danger of producing objectionable high pressures in the engine, and in consequence the engine is subjected to considerable excessive stresses.

The invention has for its object to eliminate this danger. This is attained on reversing the control mechanism, for example from "ahead" to "astern", by a movement derived from the rotation of the engine in the direction in which it was rotating before reversal of the control mechanism, cutting off the fuel feed to the working cylinders until the engine has started to run in the reverse direction of rotation corresponding to the new setting of the control mechanism. The invention can be used with any form of control mechanism for reversing the direction of rotation of the engine, such, for example, as that shown in the patent to Dyckhoff, No. 661,369, dated November 6, 1900.

One embodiment of this invention is shown, by way of example in the accompanying drawing, in which:—

Figure 1:
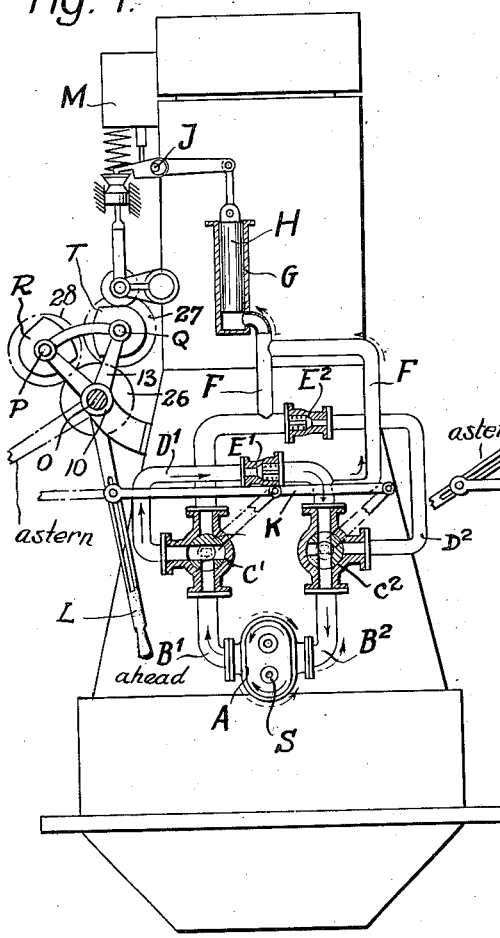
Figure 2:
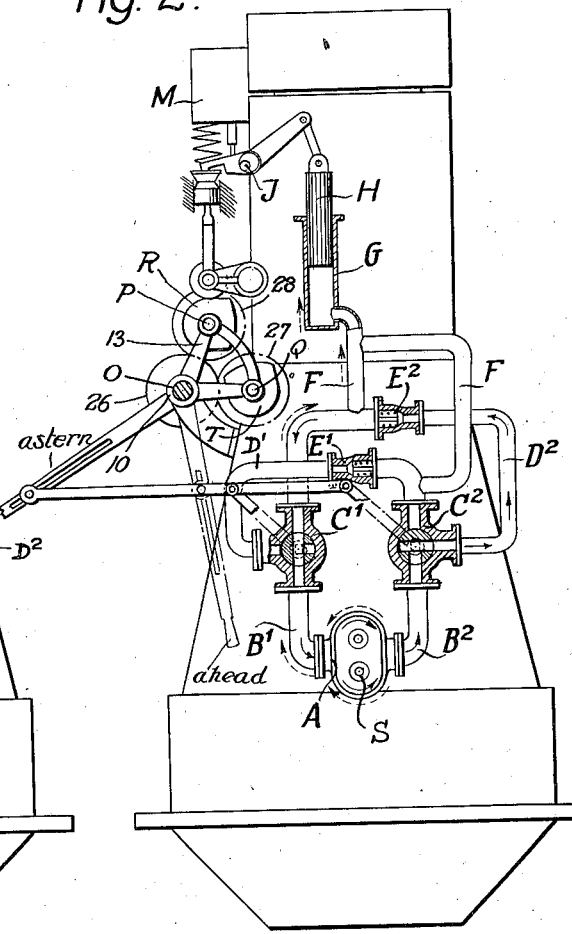
Figure 3:
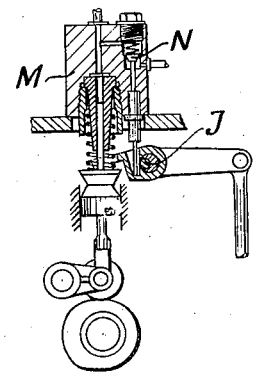
Figure 4:
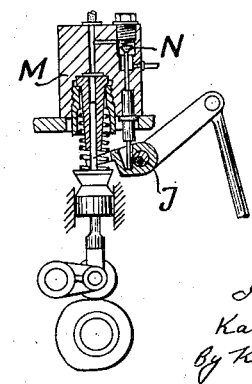

Figs. 1 and 2 show diagrammatically an internal combustion engine illustrating the arrangement of the safety device, and Figs. 3 and 4 illustrate the action of the safety device on the fuel pumps.

A indicates a liquid pump embodying a drive shaft S, driven from the crankshaft by an intermediate transmission mechanism or else forming an extension of the crankshaft. The pump in the present case, is designed as a gear pump, and consequently changes the direction in which it pumps the liquid through it when the direction of rotation of the engine is altered. From the gear pump A pipes $B^1$ and $B^2$ lead to two three-way cocks $C^1$ and $C^2$ which, when the control mechanism comprising a reversing lever L is moved, are adjusted by the rod K (Fig. 1 and Fig. 2). To the three-way cocks $C^1$ and $C^2$ are connected pipes $D^1$ and $D^2$, which connect the two cocks together in two different ways. In the pipes $D^1$ and $D^2$ are located the check valves $E^1$ and $E^2$. The check valve $E^1$ only permits the flow of liquid in the pipe $D^1$ in the direction from $C^1$ to $C^2$ and the check valve $E^2$ only permits the flow of liquid in the pipe $D^2$ in the direction from $C^2$ to $C^1$. From the pipe $D^1$ at a point between the check valve $E^1$ and the three-way cock $C^2$ and from the pipe $D^2$ at a point between the check valve $E^2$ and the three-way cock $C^1$ branch pipes F extend, which branch pipes, are connected one to the other and discharge into the auxiliary cylinder G. In the cylinder G, a pressure piston H is located, and this piston is adapted to act on the governor shaft J for the suction valves N of the fuel pumps M.

The valve control gear which determines the direction of rotation of the engine may be of the type illustrated in Figures 1 and 2, which is disclosed in detail in the above-mentioned patent to Dyckhoff No. 661,369. A shaft driven from the engine in any suitable manner is represented at O. The shaft O may be driven from the shaft S by a chain transmission, and is journalled in a rocking sleeve 10 which is mounted for rotation in suitable bearing brackets. This sleeve carries and forms the center or pivotal support for rocking frames 13 which in turn carry their respective shafts P and Q, on which are mounted the respective sets of cams R and T. Cams R are of a conformation and arrangement suitable for cooperating with the valve plungers to operate the valves to drive the engine in one direction and cams T are adapted to operate the valves in such a manner as to drive the engine in the opposite direction. The reversing lever L is attached to sleeve 10 to enable the latter to be rocked in its bearings to bring one or the other set of cams into operation. A gear 26 rigidly fixed on shaft O engages with gears 28 and 27 on shafts P and Q respectively. The motion of the rocking frames constituted by sleeve 10 and the arms 13 being concentric with shaft 8, the engagement of the gears 28, 27 with the gear 26 is maintained in all positions of the mechanism. The positioning of the parts for forward and reverse movement is illustrated in Figures 1 and 2 of the drawing. As long as the piston H remains in its elevated position shown in Fig. 2 the operative effect upon the fuel feed by either the cams R, in the illustrated position of the parts, or by the cams T, during the reverse operation, is nullified.

The mode of operation of the device is as follows:

When the reverse lever L is in the position shown in Fig. 1, for the forward travel of the engine, the pressure liquid flows from the gear pump A, in the direction of the full line arrows shown, through the three-way cock C¹, the check valve E¹ and the three-way cock C² back into the pump A. During this circulation of the liquid delivered by the pump A, the pipe F is also filled with the pressure liquid. No pressure action, however, takes place on the pressure piston H, as the quantity of pressure liquid pumped into the piping system is also drawn off again.

If the reversing control lever is then moved from the position shown in Fig. 1 ("ahead") into the position shown in Fig. 2 ("astern") the flow of liquid through these three-way cocks C¹ and C² is also reversed in the manner shown in these figures. The engine, however, still runs in the same direction as before reversal. Thus in Fig. 2, the direction of rotation and feed of the pump A remains, for the time being, the same as that in Fig. 1. Owing to the new setting of the cock C², however, the circulation is interrupted and the pressure liquid, fed by the pump A, passes in the direction of the dotted line arrows through the cock C¹ into the pipe F, which is closed on the suction side of the pump by the check valve E² on the one hand and by the closed position of the cock C² on the other hand. The pressure liquid therefore moves the pressure piston H upwardly and, as will be seen from Fig. 4, forces the suction valve N of the fuel pump M upwards by means of the governor shaft J. As is well known, this has the effect, during the decelerating period, of preventing fuel from being fed into the working cylinders, since with the suction valve N in its raised position, its function as a check valve is eliminated, and the working stroke of the pump M is without effect.

When the engine has stopped and has restarted in the reverse direction of rotation, corresponding to the position of the reversing lever according to Fig. 2, the pump A also feeds the pressure liquid in a reverse direction. As a result of this, the former pressure pipe B¹ (Fig. 2) now becomes the suction pipe and the former suction pipe B² then becomes the pressure pipe of the pump A. The pressure liquid now flows in the direction of the full line arrows in its circulation through the piping system, the check valve E² no longer forming an obstacle. In this way the pressure piston H is relieved and returns to its initial position, shown in Fig. 1. Meanwhile, the suction pipe N of the fuel pump M (Fig. 3) closes, and the fuel pump M again feeds fuel to the engine. These conditions are maintained as long as the engine continues to run in the reverse direction.

If, on again reversing, the reversing control lever L is moved to "ahead", the cocks C¹ and C² are turned back into the initial position, shown in Fig. 1. The engine, however, continues to run in the same direction of rotation as that before reversal so that the pump A feeds pressure liquid in the direction of the dotted line arrows. The check valve E¹ is closed and the liquid pressure acts on the pressure piston H, so that here again the fuel feed is interrupted until the engine has assumed the direction of rotation corresponding to the position of the reversing gear and then the pump A keeps the liquid in circulation as at the outset.

Thus, irrespective of the direction in which the engine is reversed, the device described brings about an automatic cut-off of the fuel feed while the engine is slowing down and stopped, and in this way absolutely prevents the production of dangerous high pressures in the engine.

What I claim is:—

1. In a reversible internal combustion engine; fuel feeding mechanism; a member driven by the engine, which reverses its direction of movement when the engine reverses its direction of rotation; disabling means to render said fuel feeding mechanism inoperative; alternative connections between said member and said disabling means, whereby movement of said member in one direction actuates said disabling means through one of said connections, while movement of said member in the opposite direction operates said disabling means through the other of said connections; and control means for rendering said connections alternatively inoperative.

2. In combination with an internal combustion engine having control mechanism to reverse its direction of rotation and a fuel feeding mechanism, a disabling means to render said fuel feeding mechanism inoperative while the engine is continuing to run by its momentum in a direction opposed to the new setting of said control mechanism.

3. In combination with an internal combustion engine having control mechanism to reverse its direction of rotation and a fuel feeding mechanism; a movable member connected with a running part of the engine so as to be reversible as the engine reverses its direction of rotation, and means controlled jointly by said control mechanism and said member to render said fuel feeding means inoperative while the engine is turning in a direction opposed to the setting of said control mechanism.

KARL MOHR.